(12) United States Patent
Vajravel

(10) Patent No.: US 10,223,321 B2
(45) Date of Patent: Mar. 5, 2019

(54) COMBINING REDIRECTED USB INTERFACES INTO A SINGLE COMPOSITE DEVICE

(71) Applicant: Dell Products L.P., Round Rock, TX (US)

(72) Inventor: Gokul Thiruchengode Vajravel, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 308 days.

(21) Appl. No.: 15/087,145

(22) Filed: Mar. 31, 2016

(65) Prior Publication Data

US 2017/0289313 A1     Oct. 5, 2017

(51) Int. Cl.
  *G06F 13/42*   (2006.01)
  *G06F 13/38*   (2006.01)

(52) U.S. Cl.
  CPC ........ *G06F 13/4282* (2013.01); *G06F 13/385* (2013.01)

(58) Field of Classification Search
  CPC ..... H04L 67/42; G06F 13/4282; G06F 13/385
  See application file for complete search history.

(56) References Cited

U.S. PATENT DOCUMENTS

| | | | | |
|---|---|---|---|---|
| 2002/0152348 A1* | 10/2002 | Scales | ................... | G06F 13/426 710/313 |
| 2009/0150550 A1* | 6/2009 | Barreto | ............. | H04L 29/08846 709/228 |
| 2011/0185009 A1* | 7/2011 | Chang | ..................... | G06F 3/023 709/203 |
| 2013/0283371 A1* | 10/2013 | Sitbon | ..................... | G06F 21/44 726/17 |
| 2014/0082235 A1* | 3/2014 | Kaushik | ................ | G06F 13/102 710/62 |
| 2014/0330978 A1* | 11/2014 | Venkatesh | ......... | H04L 29/08567 709/226 |
| 2017/0061145 A1* | 3/2017 | Vajravel | .............. | G06F 21/6218 |

\* cited by examiner

*Primary Examiner* — Nicholas R Taylor
*Assistant Examiner* — Tania M Pena-Santana
(74) *Attorney, Agent, or Firm* — Kirton McConkie; Brian Tucker

(57) ABSTRACT

When client-side USB redirection techniques redirect an interface as a simple device, multiple redirected interfaces can be combined on the server side into a single composite device. When redirecting an interface, the client-side proxy can include an interface hint identifying the interface number in the device arrival notification sent to the server-side agent. Upon receiving multiple device arrival notifications that each include an interface hint, the agent can recombine the appropriate information to generate composite device information which will represent a composite device that includes each interface. The agent can then provide this composite device information to the virtual bus driver to initiate the process of loading the appropriate drivers for the composite device. Accordingly, even though each redirected interface of the composite device is reported to the server-side agent individually, the operating system on the server will still see a composite device.

19 Claims, 13 Drawing Sheets

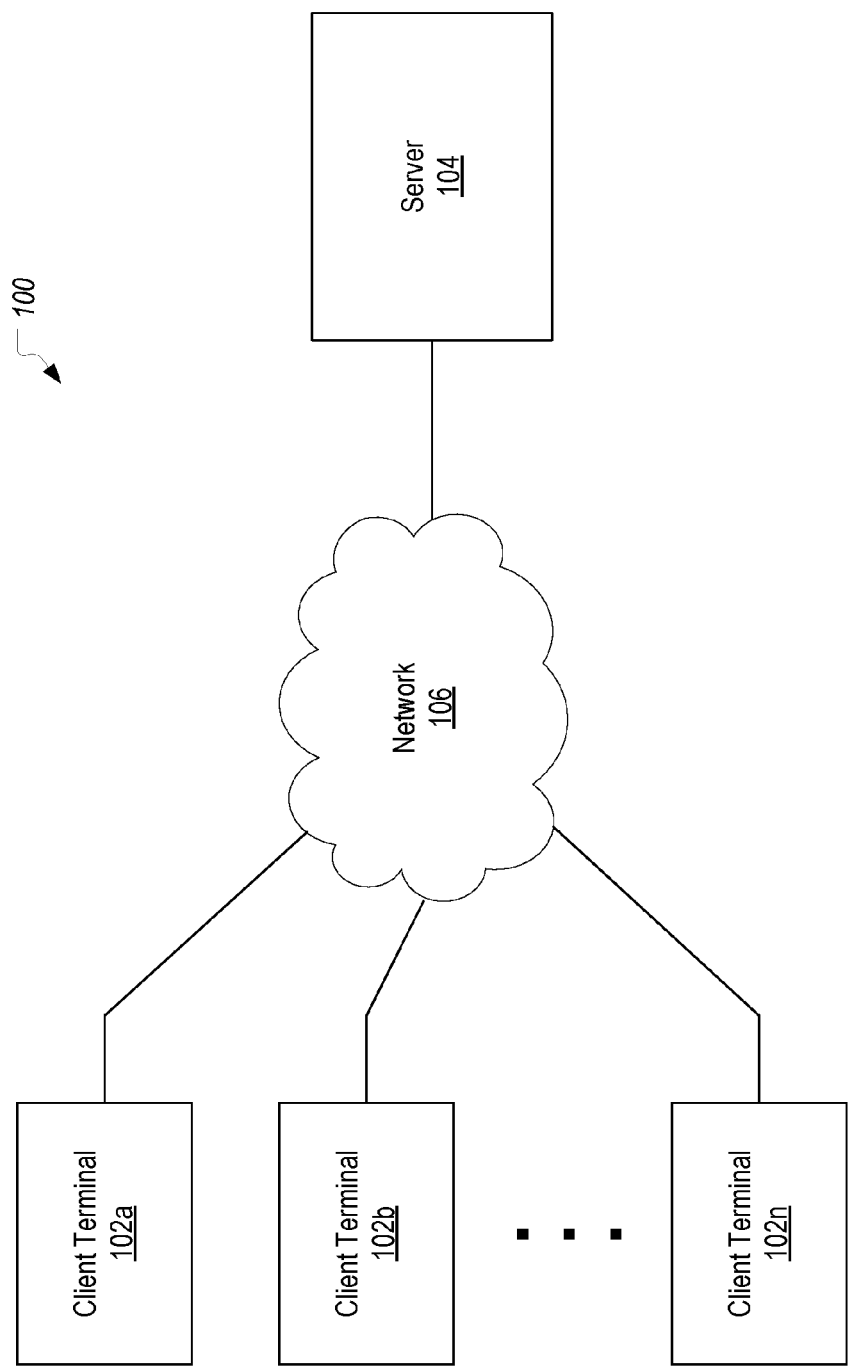

COMBINING REDIRECTED USB INTERFACES INTO A SINGLE COMPOSITE DEVICE

CROSS-REFERENCE TO RELATED APPLICATIONS

N/A

BACKGROUND

The present invention is generally directed to USB device redirection in a virtual desktop infrastructure (VDI) environment. USB device redirection generally refers to making a USB device that is connected to a client terminal accessible within a virtual desktop as if the USB device had been physically connected to the virtual desktop. In other words, when USB device redirection is implemented, a user can connect a USB device to his or her client terminal and the USB device will function as if it had been connected to the server.

FIGS. 1, 2A and 2B and the following description will provide a general overview of how USB device redirection is oftentimes implemented. In FIG. 1, a computing system 100 is depicted as including a number of client terminals 102a-102n (referenced generally herein as client(s) 102) in communication with a server 104 via a network 106. Server 104 can be configured to support a remote session (e.g., a remote desktop session) wherein a user at a client 102 can remotely access applications and data at the server 104 from the client 102. Such a connection may be established using any of several well-known techniques such as the Remote Desktop Protocol (RDP) and the Citrix® Independent Computing Architecture (ICA).

Client terminal 102 may represent a computer, a mobile phone (e.g., smart phone), a laptop computer, a thin client terminal, a personal digital assistant (PDA), a portable computing terminal, or a suitable terminal or device with a processor. Server 104 may represent a computer, a laptop computer, a computing terminal, a virtual machine (e.g., VMware® Virtual Machine), a desktop session (e.g., Microsoft Terminal Server), a published application (e.g., Microsoft Terminal Server) or a suitable terminal with a processor.

Client 102 may initiate a remote session with server 104 by sending a request for remote access and credentials (e.g., login name and password) to server 104. If server 104 accepts the credentials from client 102, then server 104 may establish a remote session, which allows a user at client 102 to access applications and data at server 104. During the remote session, server 104 sends display data to client 102 over network 106, which may include display data of a desktop and/or one or more applications running on server 104. The desktop may include, for example, icons corresponding to different applications that can be launched on server 104. The display data allows client 102 to locally display the desktop and/or applications running on server 104.

During the remote session, client 102 may send user commands (e.g., inputted via a mouse or keyboard at client 102) to server 104 over network 106. Server 104 may process the user commands from client 102 similar to user commands received from an input device that is local to server 104. For example, if the user commands include mouse movements, then server 104 may move a pointer on the desktop running on server 104 accordingly. When the display data of the desktop and/or application changes in response to the user commands, server 104 sends the updated display data to client 102. Client 102 locally displays the updated display data so that the user at client 102 can view changes at server 104 in response to the user commands. Together, these aspects allow the user at client 102 to locally view and input commands to the desktop and/or application that is running remotely on server 104. From the perspective of the client side, the desktop running on server 104 may represent a virtual desktop environment.

FIG. 2A is a block diagram of a local device virtualization system 200 in accordance with embodiments of the present invention. System 200 may include client 102 in communication with server 104 over network 106 as illustrated in FIG. 1. Client 102 may include a proxy 210, a stub driver 220, and a bus driver 230. Client 102 can be connected to a device 240, as shown in FIG. 2A. Server 104 may include an agent 250 and a virtual bus driver 260.

In accordance with USB device redirection techniques, while device 240 is not locally or physically connected to server 104 and is remote to server 104, device 240 appears to server 104 as if it is locally connected to server 104, as discussed further below. Thus, device 240 appears to server 104 as a virtual device 290.

By way of illustration and not limitation, device 240 may be any type of USB device including a machine-readable storage medium (e.g., flash storage device), a printer, a scanner, a camera, a facsimile machine, a phone, an audio device (e.g., a headset), a video device (e.g., a camera), a peripheral device, or other suitable device that can be connected to client 102. Device 240 may be an external device (i.e., external to client 102) or an internal device (i.e., internal to client 102).

Bus driver 230 can be configured to allow the operating system and programs of client 102 to interact with device 240. In one aspect, when device 240 is connected to client 102 (e.g., plugged into a port of client 102), bus driver 230 may detect the presence of device 240 and read information regarding device 240 ("device information") from device 240. The device information may include features, characteristics and other information specific to device 240 such as a device descriptor (e.g., product ID, vendor ID and/or other information), a configuration descriptor, an interface descriptor, an endpoint descriptor and/or a string descriptor. Bus driver 230 may communicate with device 240 through a computer bus or other wired or wireless communications interface.

In accordance with USB device redirection techniques, device 240 may be accessed from server 104 as if the device were connected locally to server 240. Device 240 may be accessed from server 104 when client 102 is connected to server 104 through a user session running on server 104. For example, device 240 may be accessible from the desktop running on server 104 (i.e., virtual desktop environment). To enable this, bus driver 230 may be configured to load stub driver 220 as the default driver for device 240. Stub driver 220 may be configured to report the presence of device 240 to proxy 210 and to provide the device information (e.g., device descriptor) to proxy 210. Proxy 210 may be configured to report the presence of device 240, along with the device information, to agent 250 of server 104 over network 106. Thus, stub driver 220 redirects device 240 to server 104 via proxy 210.

Agent 250 may be configured to receive the report from proxy 210 that device 240 is connected to client 102 and the device information. Agent 250 may further be configured to associate with the report from proxy 210 one or more identifiers for client 102 and/or for a user session through which client 102 is connected to server 104, such as a session number or a session locally unique identifier (LUID). Agent 250 can provide notification of device 240, along with the device information, to virtual bus driver 260. Virtual bus driver 260 (which may be a TCX USB bus driver, or any other bus driver) may be configured to create and store in memory a record corresponding to device 240, the record including at least part of the device information and session identifiers received from agent 250. Virtual bus driver 260 may be configured to report to operating system 170 of server 104 that device 240 is connected and to provide the device information to the operating system. This allows the operating system of server 104 to recognize the presence of device 240 even though device 240 is connected to client 102.

The operating system of server 104 may use the device information to find and load one or more appropriate device drivers for device 240 at server 104. Each driver may have an associated device object (object(s) 281*a*, 281*b*, . . . , 281*n*, referred to generally as device object(s) 281), as illustratively shown in FIG. 2A. A device object 281 is a software implementation of a real device 240 or a virtualized (or conceptual) device 290. Different device objects 281 layer over each other to provide the complete functionality. The different device objects 281 are associated with different device drivers (driver(s) 282*a*, 282*b*, . . . 282*n*, referred to generally as device driver(s) 282). In an example, a device 240 such as a USB flash drive may have associated device objects including objects corresponding to a USB driver, a storage driver, a volume manager driver, and a file system driver for the device. The device objects 281 corresponding to a same device 240 form a layered device stack 280 for device 240. For example, for a USB device, a USB bus driver will create a device object 281*a* stating that a new device has been plugged in. Next, a plug-and-play (PNP) component of the operating system will search for and load the best driver for device 240, which will create another device object 281*b* that is layered over the previous device object 281*a*. The layering of device objects 281 will create device stack 280.

Device objects 281 may be stored in a memory of the server 104 associated with virtual bus driver 260. In particular, device objects 281 and resulting device stack 280 may be stored in random-access memory of server 104. Different devices 240/290 can have device stacks having different device objects and different numbers of device objects. The device stack may be ordered, such that lower level device objects (corresponding to lower level device drivers) have lower numbers than higher level device objects (corresponding to higher level device drivers). The device stack may be traversed downwards by traversing the stack from higher level objects to lower level objects. For example, in the case of an illustrative device stack 280 corresponding to a USB flash drive, the ordered device stack may be traversed downwards from a high-level file system driver device object, to a volume manager driver device object, to a storage driver device object, to a USB driver device object, and finally to a low-level virtual bus driver device object. Different device stacks 280 can be layered over each other to provide the functionality of the devices 240/290 inside devices, like USB Headsets, or USB pen drives. A USB pen drive, for example, can create a USB device stack first, over which it can create a storage device stack, where each of the device stacks have two or more device objects.

Once one or more device object(s) 281 are loaded by operating system 170 of server 104, each device object 281 can create a symbolic link (also referred to as a "device interface") to device object 281 and associated device driver 282. The symbolic link is used by applications running on server 104 to access device object 281 and device 240/290. The symbolic link can be created by a call to a function such as IoCreateSymbolicLink( ) including such arguments as a name for the symbolic link, and a name of device object 281 or associated device 240. In one example, for example, a symbolic link to a USB flash drive device 240 is created by a call from a device object 281 for device 240 to the function IoCreateSymbolicLink( ) including arguments "\\GLOBAL??\C:" (i.e., the name for the symbolic link) and "\Device\HarddiskVolume1" (i.e., a name of the device object).

The creation of a symbolic link results in an entry being created in an object manager namespace (OMN) of operating system 170. The OMN stores information on symbolic links created for and used by operating system 170, including symbolic links for devices 240, virtualized devices 290, and applications 270 running on server 104.

As a result of the symbolic link creation process, a symbolic link to device 240 is enumerated in the OMN of server 104. Once the presence of device 240 is reported to operating system 170 of server 104, device 240 may be accessible from a user session (and associated desktop) running on server 104 (i.e., virtual desktop environment). For example, device 240 may appear as an icon on the virtual desktop environment and/or may be accessed by applications running on server 104.

An application 270 running on server 104 may access device 240 by sending a transaction request including the symbolic link for device 240 to operating system 170. Operating system 170 may consult the Object Manager Namespace to retrieve an address or other identifier for the device itself 240 or for a device object 281 associated with device 240. Using the retrieved address or identifier, operating system 170 forwards the transaction request for device 240 either directly, through a device object 281 of device stack 280, and/or through virtual bus driver 260. Virtual bus driver 260 may direct the transaction request to agent 250, which sends the transaction request to proxy 210 over network 106. Proxy 210 receives the transaction request from agent 250, and directs the received transaction request to stub driver 220. Stub driver 220 then directs the transaction request to device 240 through bus driver 230.

Bus driver 230 receives the result of the transaction request from device 240 and sends the result of the transaction request to stub driver 220. Stub driver 220 directs the result of the transaction request to proxy 210, which sends the result of the transaction request to agent 250 over network 106. Agent 250 directs the result of the transaction request to virtual bus driver 260. Virtual bus driver 260 then directs the result of the transaction request to application 270 either directly or through a device object 281 of device stack 280.

Thus, virtual bus driver 260 may receive transaction requests for device 240 from application 270 and send results of the transaction requests back to application 270 (either directly or through a device object 281 of device stack 280). As such, application 270 may interact with virtual bus driver 260 in the same way as with a bus driver for a device that is connected locally to server 104. Virtual bus driver 260 may hide the fact that it sends transaction requests to agent 250 and receives the results of the transaction requests from agent 250 instead of a device that is connected locally to server 104. As a result, device 240 connected to client 102 may appear to application 270 as if the physical device 240 is connected locally to server 104.

The Object Manager Namespace (OMN) stores information on symbolic links created for use by operating system 170, including symbolic links for devices and for applications running on server 104. The Object Manager Namespace generally includes several different namespaces for storing symbolic link information for applications and devices. For example, the Object Manager Namespace can include namespaces such as: a "Global" namespace used to store symbolic link information for devices and applications that are shared by all user sessions running on server 104; various "Local" namespaces, each associated with a user session running on server 104, used to store information for applications used by (and restricted to) the associated user session; and a "Device" namespace used to store device object names of devices and virtual devices accessible by server 104. A "Global" namespace may be referred to as a global namespace. A "Local" namespace may be referred to as a local namespace. A "Device" namespace may be referred to as a device namespace.

As described herein, symbolic links can be stored in a global namespace or a local namespace. Symbolic links stored in a global namespace may be available to the entire system (i.e., to all user sessions running on server 104), while symbolic links stored in a local namespace may only be seen and accessed by the session for which they are created. For example, "\\GLOBAL??\c:" may be a symbolic link stored in a global namespace. "\Device\HarddiskVolume1" may be a device object name stored in a device namespace. A symbolic link "\\GLOBAL??\c:" may be pointing to a device object having a device object name of "\Device\HarddiskVolume1". Because "c:" is a symbolic link in the global namespace directory, such a symbolic link may be accessed by the entire system, including all the users logged in through their respective user sessions. A user application can open "\\GLOBAL??\c:" or just "c:" to access the actual device.

In certain operating systems, such as the Windows operating system, the creation of the symbolic link for a device 240 results in an entry being created in a Global namespace of the Object Manager Namespace. Because the symbolic link is created in the Global namespace, the symbolic link can be accessed from any user session running on server 104. As a result, the device 240 associated with the symbolic link can be accessed from any user session on server 104, and/or from any client terminal having an active user session on server 104.

FIG. 2B illustratively shows a block diagram of a computer system 100 providing local device virtualization. As previously described in relation to FIG. 1, system 100 includes client terminals 102a-102n communicating through network 106 with server 104. As described in relation to FIG. 2A above, each device 240a, 240b can be virtualized on server 104 to provide access to the device from a user session on server 104 through a corresponding virtual device 290a, 290b. For example, when device 240a is connected to client terminal 102a, drivers for device 240a may be loaded in operating system 170 of server 104, device 240a may be virtualized on server 104 as virtual device 290a, and a symbolic link to the device 240a may be created in the Object Manager Namespace of operating system 170. Once the symbolic link is created, a user of client terminal 102a may be able to access device 240a through a user session on server 104. Similarly, when device 240b is connected to client terminal 102b, a symbolic link to the device 240b may be created in the Object Manager Namespace of operating system 170 of server 104. Once the symbolic link is created, a user of client terminal 102b may be able to access device 240b through a user session on server 104.

The symbolic links to the devices 240a, 240b are created in a Global namespace of the Object Manager Namespace of operating system 170. As a result, the symbolic links and associated devices can be accessed from and used by any user session running on server 104. For example, as illustratively shown in FIG. 2B, a user of client terminal 102a having a user session on server 104 may access both device 240a as well as virtual device 240b' from the user session. Similarly, a user of client terminal 102b having a user session on server 104 may access both device 240b as well as virtual device 240a' from the user session. Finally, a user of client terminal 102c having a user session on server 104 may access both virtual device 240a' and 240b' from the user session.

Hence, the device virtualization described in relation to FIGS. 2A and 2B provides unrestricted access to devices 240 connected locally to client terminals 102 from any user session on server 104. As such, a redirected device becomes a local device to the server and can be accessed by all the users' sessions connected to that server. For example a printer or a mass storage device, when redirected by one user connected through a session on the server, will show up as a local device and all the users can read/write the mass storage device and print using the printer.

This redirection process is implemented in a similar manner even when the redirected device is a USB composite device. A USB composite device (or simply "composite device") is a USB device that performs more than one type of function. More specifically, a composite device includes more than one device class. For example, a USB printer that also includes a scanner is a composite device since the printer functionality and the scanner functionality fall into different classes. In USB terminology, a composite device is generally referred to as providing multiple interfaces. In this sense, an individual interface of a composite device can be viewed in a similar manner as a single "non-composite" USB device.

Accordingly, when a composite device is connected to a client terminal and redirected to the server, each interface of the composite device is redirected and made available on the server. FIG. 3 illustrates an example of how this redirection of a composite device is implemented. FIG. 3 is substantially the same as FIG. 2A. However, in FIG. 3, a composite device 340 having two interfaces 340a, 340b is connected to client terminal 102. In response, and assuming redirection is enabled on client terminal 102, both interfaces 340a, 340b will be redirected to server 104. It is noted that, although a single stub driver 220 is shown, it many cases, a separate stub driver 220 would be loaded for each redirected interface.

In a similar manner as described above, a device stack 391a, 391b is created for each interface 340a, 340b respectively. It is noted that in many instances, a USB composite class driver (e.g., usbccgp.sys in the Windows implementations) can be employed as a lower level driver in each of device stacks 391a, 391b. However, even when this USB composite class driver is employed, two separate device stacks would still be created for the two interfaces of the composite device.

Device stack 391a comprises layered objects 394a-394n with corresponding drivers 395a-395n, and device stack 391b comprises layered objects 396a-396n with corresponding drivers 397a-397n. Each device stack functions in a similar manner as described above thereby causing virtual devices 390a, 390b corresponding to interfaces 340a, 340b respectively to appear as if they were locally connected to server 104. In this way, each of interfaces 340a, 340b will become accessible within any remote session established with server 104.

In some cases, it may not be desirable to redirect all interfaces of a composite device. Accordingly, various client side redirection techniques have been developed to allow less than all of the interfaces of a composite device to be redirected to the server with the non-redirected interfaces remaining local for use in a typical fashion on the client. For example, the Logitech C310 HD webcam includes three interfaces: (1) a webcam; (2) an HID interface; and (3) a microphone. If this webcam were connected to client terminal 102 while client terminal 102 has established a remote session with server 104, the client side components may be configured to redirect the webcam and HID interfaces while leaving the microphone interface local.

FIG. 4 illustrates an example of how this selective redirection of interfaces of a composite device can be implemented. FIG. 4 is substantially the same as FIG. 3 but provides some additional details to better explain how interfaces of a composite device can be selectively redirected. In FIG. 4, a composite device 440 that includes a webcam interface 440a, an HID interface 440b, and a microphone interface 440c is connected to client terminal 102. In response, bus driver 230 creates a physical device object (PDO) (not shown) for composite device 440 and generates a plug-and-pay event to report the new PDO to the operating system (not shown). The operating system will then query bus driver 230 for the hardware IDs associated with the PDO in order to identify the appropriate driver to load. In many cases when the connected device is a composite device, this process will result in a generic parent driver (Usbccgp.sys) being loaded which is represented in FIG. 4 as USB composite class driver 231.

When device redirection is enabled, proxy 210 can be configured to interface with USB composite class driver 231 (e.g., via hooking or filtering) in order to determine which interfaces composite device 440 includes. In this example, it will be assumed that proxy 210 is configured to redirect Webcam and HID interfaces but to leave microphone interfaces local. Accordingly, FIG. 4 shows that a webcam stub driver 420a and an HID stub driver 420b are loaded to implement redirection of the corresponding interfaces in the same manner as described above with respect to stub driver 220 (i.e., by causing device stacks 491a and 491b to be created on server 104 representing virtual webcam 490a and virtual HID 490b respectively). In contrast, because the microphone interface is not redirected, a microphone driver stack 491c is created only on client terminal 102 in a standard manner.

The operating system generates a separate hardware identifier for each interface of a composite device. The hardware identifier is generated from the idVendor and idProduct fields of the USB_DEVICE_DESCRIPTOR structure for the USB device. When the device includes multiple interfaces, the number of the interface is appended at the end of the hardware identifier to create the different hardware identifiers for each interface. For example, in the Logitech C310 HD webcam, the webcam interface has a hardware ID of Vid_046D&Pid_081B&MI_00, the HID interface has a hardware ID of Vid_046D&Pid_081B&MI_01, and the microphone interface has a hardware ID of Vid_046D&Pid_081B&MI_02. The "MI" in the suffix MI_xx indicates that it is an interface to a composite device and the "xx" indicates which interface number it is. Therefore, the webcam is interface 00, the HID is interface 01, and the microphone is interface 02. These hardware identifiers are employed by the operating system to load the appropriate driver(s) (i.e., to implement plug-and-play functionality).

However, when less than all of the interfaces of a composite device are redirected, proxy 210 will treat each redirected interface as a simple USB device (i.e., as if it were not an interface of a composite device). More particularly, proxy 210 will report to agent 250 that a webcam device has been connected and separately report that an HID has been connected to client terminal 102. Because the interfaces are redirected as simple devices (rather than as part of a composite device), the server side functionality will not generate a hardware identifier for the interface that includes the interface number suffix.

A general example of this is shown in FIG. 4A. When composite device 440 is connected to client terminal 102, proxy 210 can receive device information 400 pertaining to composite device 440. Device information 400 may include a device descriptor, one or more configuration descriptors (only one is shown), three interface descriptors (one for each of the webcam, HID, and microphone interfaces), and one or more endpoint descriptors for each interface. This information can be obtained in any suitable manner such as by reading the USB_DEVICE_DESCRIPTOR, USB_CONFIGURATION_DESCRIPTOR, USB_INTERFACE_DESCRIPTOR, AND USB_ENPOINT_DESCRIPTOR structures for composite device 440 or otherwise obtaining the relevant content of such descriptors from the underlying driver.

In this example, since the microphone interface will not be redirected, proxy 210 can redirect the other two interfaces as if they were simple USB devices. For example, in FIG. 4A, proxy 210 is shown as sending a device arrival notification 401 to agent 250 where the device arrival notification 401 includes a subset 400a of device information 400. Assuming device arrival notification 401 pertains to webcam interface 440a, subset 400a can include only the interface descriptor pertaining to the webcam interface with the configuration descriptor being configured to reflect that only a single interface is provided (e.g., by setting the bNumInterfaces field in the USB_CONFIGURATION_DESCRIPTOR structure to 0x01). The device descriptor in subset 400a can also include a bDeviceClass field set to the class code for the interface (as opposed to specifying this class code in the interface descriptor as would be the case in device information 400). Proxy 210 would also send a separate but similar device arrival notification pertaining to the HID interface.

As a result, during the plug-and-play functionality on server 104, operating system 170 will generate a hardware identifier of Vid_046D&Pid_081B for each redirected interface. Operating system 170 will then attempt to identify appropriate driver(s) using this hardware identifier. However, because the vendor supplied driver will be registered under the hardware identifier that includes the "MI_xx" suffix, operating system 170 will not load the appropriate vendor supplied driver. Instead, operating system 170 may load a generic driver or no driver at all. For example, FIG. 4 represents a case where operating system 170 has loaded a generic driver 495a for virtual webcam 490a and a generic driver 495b for virtual HID 490b. If a generic driver is loaded for the redirected interface, the full vendor-supplied functionality may not be available for the redirected interface. Further, if no driver is loaded, the redirected interface will not be available on server 104 (and will also not be available on client terminal 102 due to the redirection).

BRIEF SUMMARY

The present invention extends to methods, systems, and computer program products for combining redirected USB interfaces into a single composite device. The present invention can be implemented in conjunction with client-side USB redirection techniques which redirect an interface as a simple device. When multiple interfaces of a composite device are to be redirected, the client-side proxy can include an interface hint identifying the corresponding interface number in each device arrival notification sent to the server-side agent. Upon receiving multiple device arrival notifications that each include an interface hint, the agent can recombine the appropriate information to generate composite device information which will represent a composite device that includes each interface. The agent can then provide this composite device information to the virtual bus driver to initiate the process of loading the appropriate drivers for the composite device. Accordingly, even though each redirected interface of the composite device is reported to the server-side agent individually (i.e., as if it were a simple USB device), the operating system on the server will still see a composite device.

In one embodiment, the present invention is implemented as a method performed by a client-side proxy for combining multiple redirected USB interfaces into a single composite device. A client-side proxy can detect that a plurality of interfaces of a composite device are to be redirected to a server. For each of the plurality of interfaces, the proxy can create a device arrival notification that includes device information pertaining to the interface. Additionally, the proxy can add an interface hint to each device arrival notification. The interface hint identifies an interface number of the corresponding interface within the composite device. The proxy then sends the plurality of device arrival notifications to an agent on the server.

In another embodiment, the present invention is implemented as a method performed by a server-side agent for combining multiple redirected USB interfaces into a single composite device. The agent can receive a plurality of device arrival notifications. Each device arrival notification includes device information pertaining to a redirected interface of a composite device. The agent can detect, for each device arrival notification, the presence of an interface hint in the device arrival notification. In response, the agent can generate composite device information that includes the device information from each of the device arrival notifications such that the composite device information defines each of the interfaces as interfaces of a composite device on the server.

In another embodiment, the present invention is implemented as a method performed by a client-side proxy and a server-side agent for combining multiple redirected USB interfaces into a single composite device. The proxy can detect that a plurality of interfaces of a composite device are to be redirected to a server. For each of the plurality of interfaces, the proxy can create a device arrival notification that includes a device descriptor having a device class field that is assigned a class code of the interface. Additionally, the proxy can add an interface hint to each device arrival notification. The interface hint identifies an interface number of the corresponding interface within the composite device. Then, the proxy can send the plurality of device arrival notifications to the agent. In response to detecting the interface hints included in the device arrival notifications, the agent can create a new device descriptor that includes a device class field that is assigned a class code representing a composite device and an interface descriptor for each device arrival notification. Each interface descriptor is assigned the class code of the corresponding interface.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIG. 1 illustrates an example computing environment in which the present invention can be implemented;

DETAILED DESCRIPTION

The present invention will be described primarily using an example in which the webcam and HID interfaces of a Logitech C310 HD webcam composite device are redirected while the microphone interface is not, as was described in the Background. As introduced above, the present invention can be employed in implementations where the client-side components redirect an interface of a composite device as if it were a simple (i.e., non-composite) USB device. In such cases, the client-side proxy and server-side agent of the redirection platform can interact to allow the separately redirected interfaces to be recombined into a composite device on the server thereby causing the server to load the driver(s) registered for the composite device.

Figure 2A:
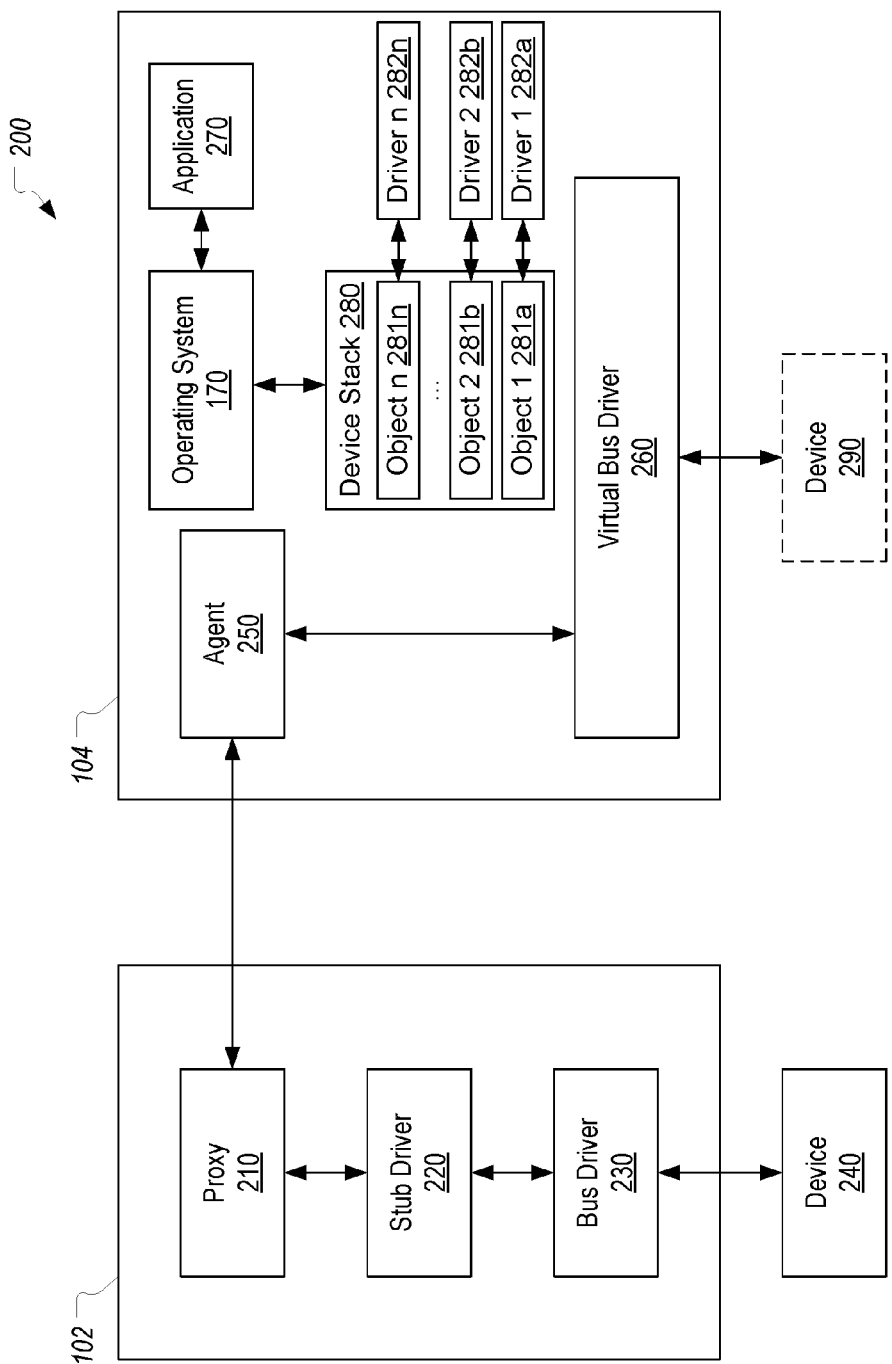
FIG. 2A illustrates how a USB device can be redirected from a client terminal to a server.
Figure 2B:
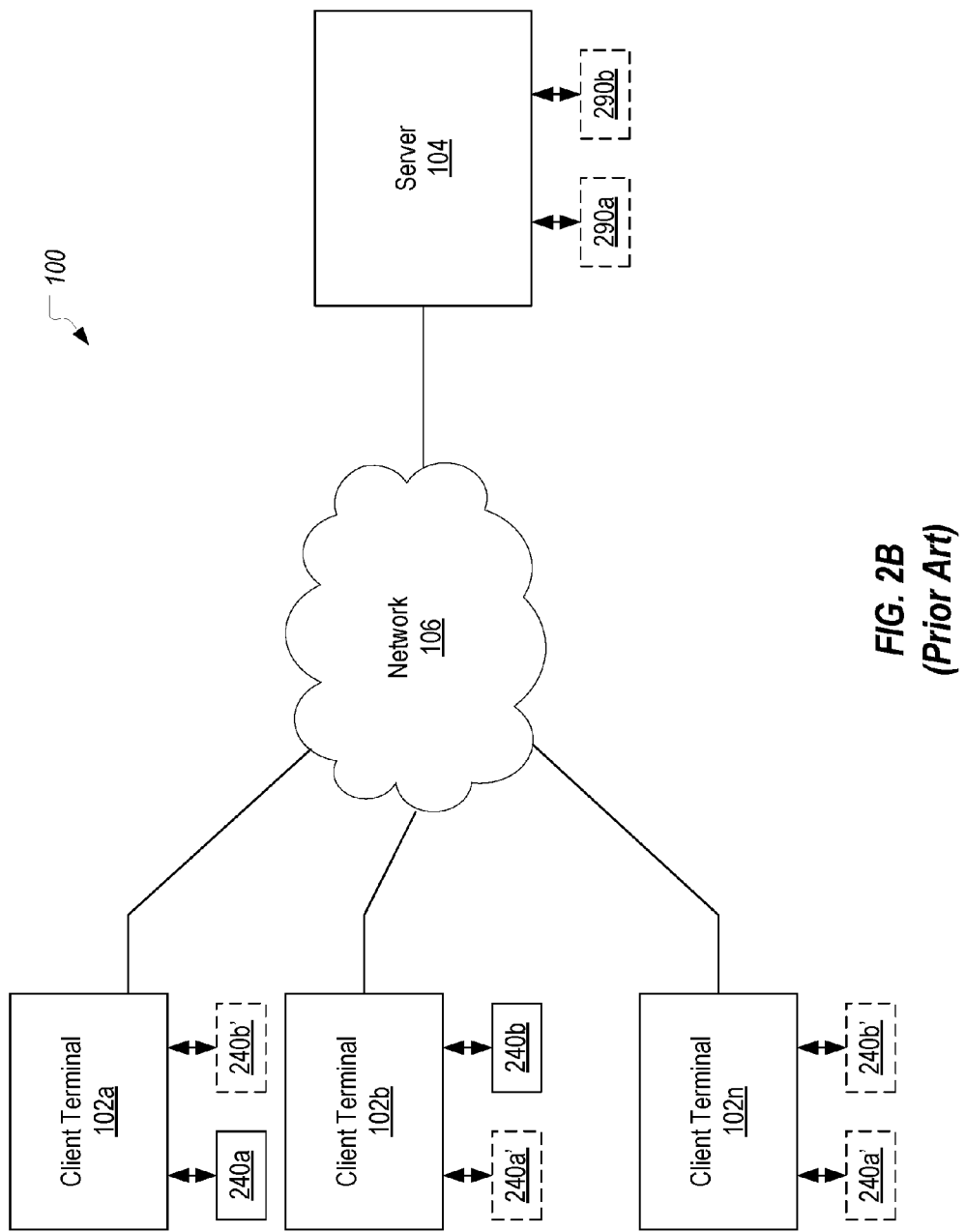
FIG. 2B illustrates how redirecting the USB device to the server can make the device accessible to any remote session established with the server.
Figure 3:
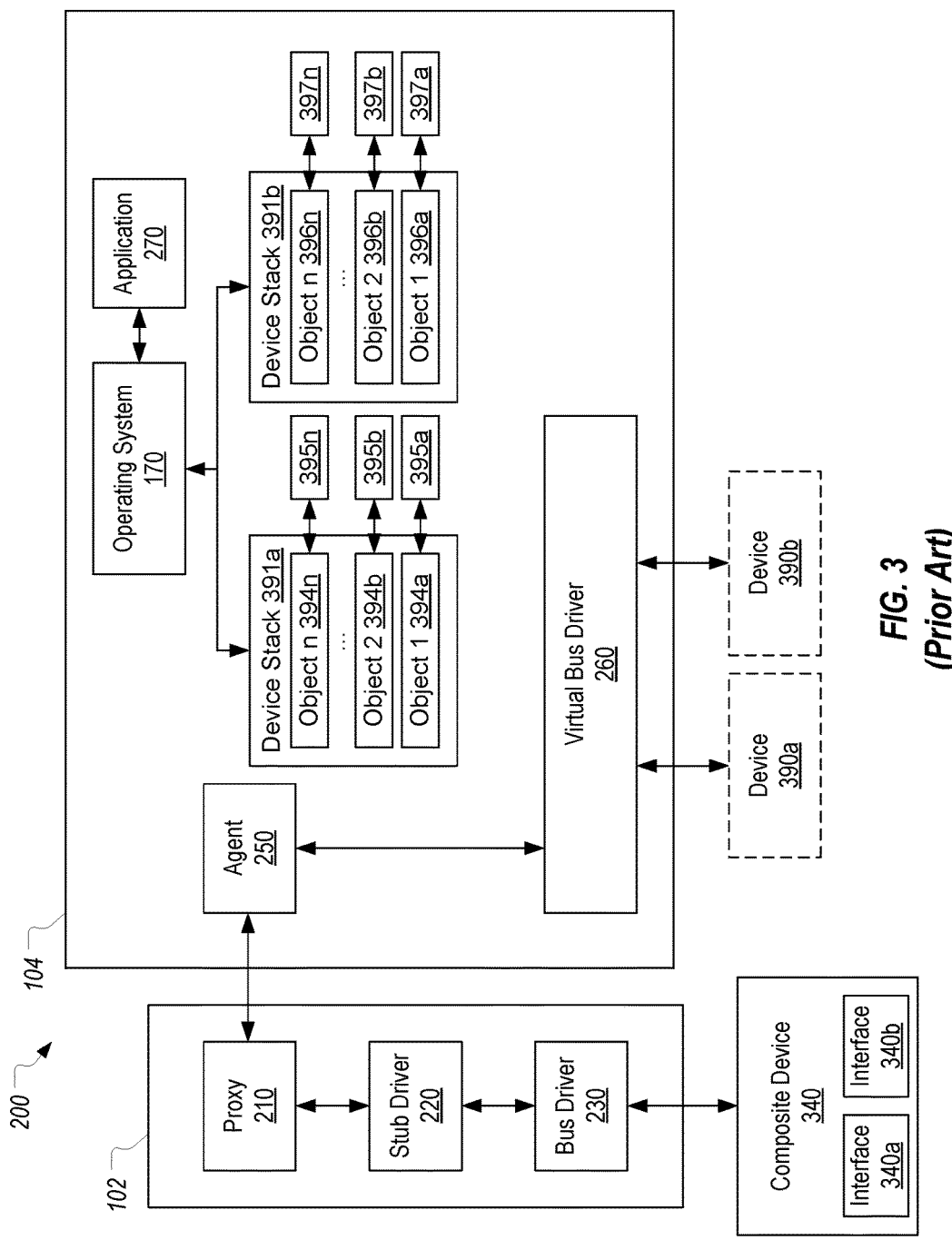
FIG. 3 illustrates how two interfaces of a composite USB device can be redirected to the server.
Figure 4:
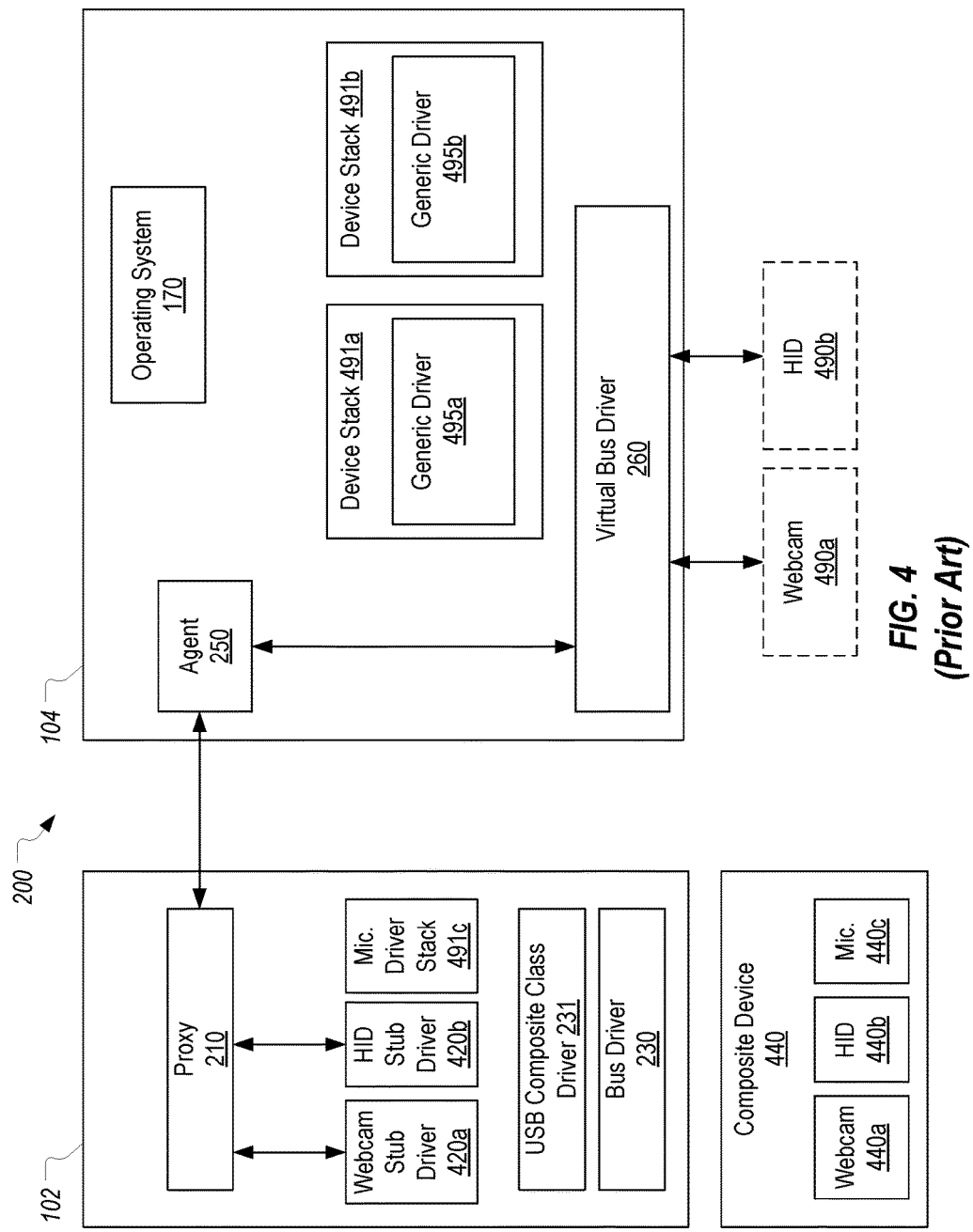
FIG. 4 illustrates how interfaces of a composite USB device can be selectively redirected to a server.
Figure 4A:
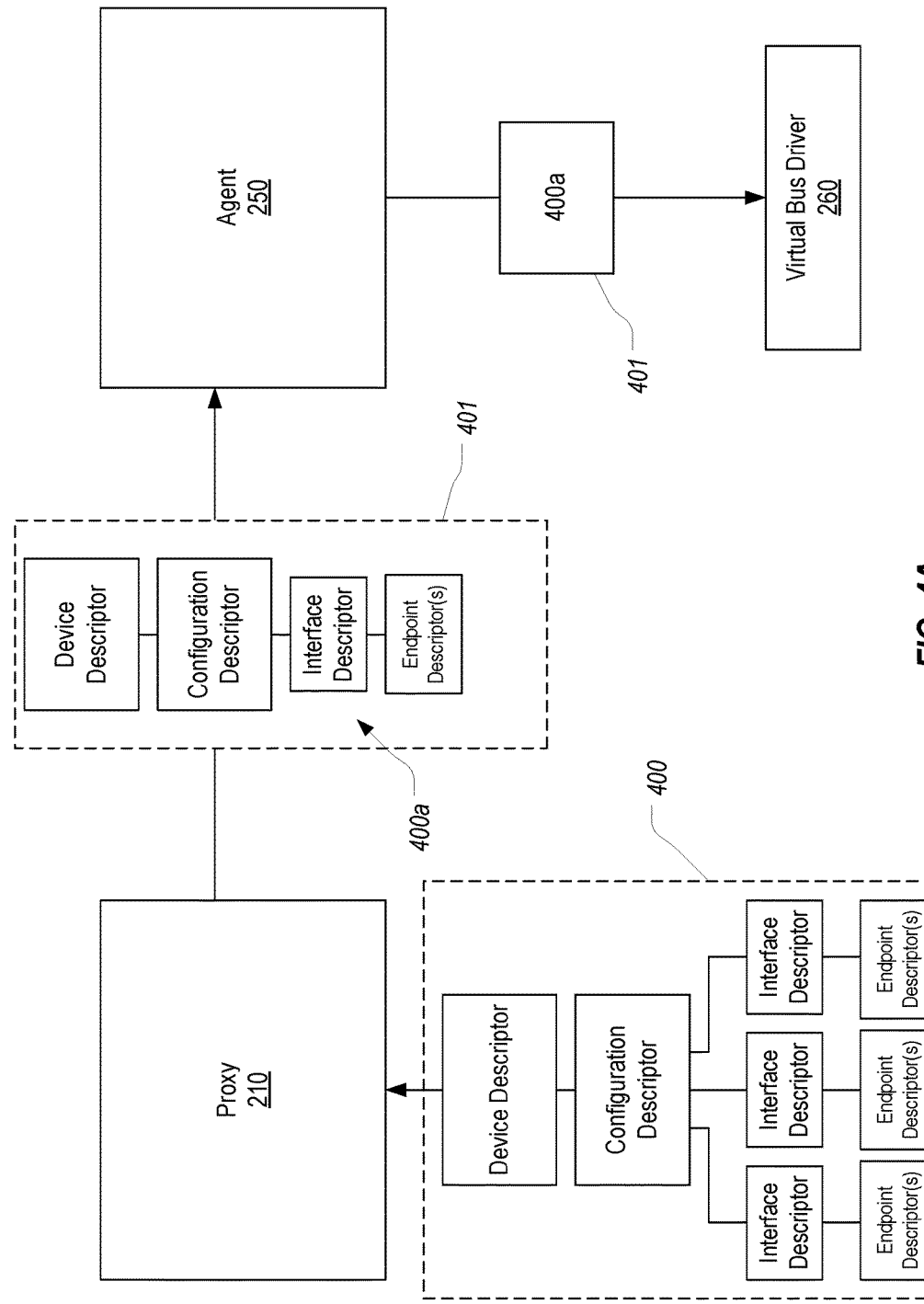
FIG. 4A illustrates how an interface can be redirected as a simple device.
Figure 5:
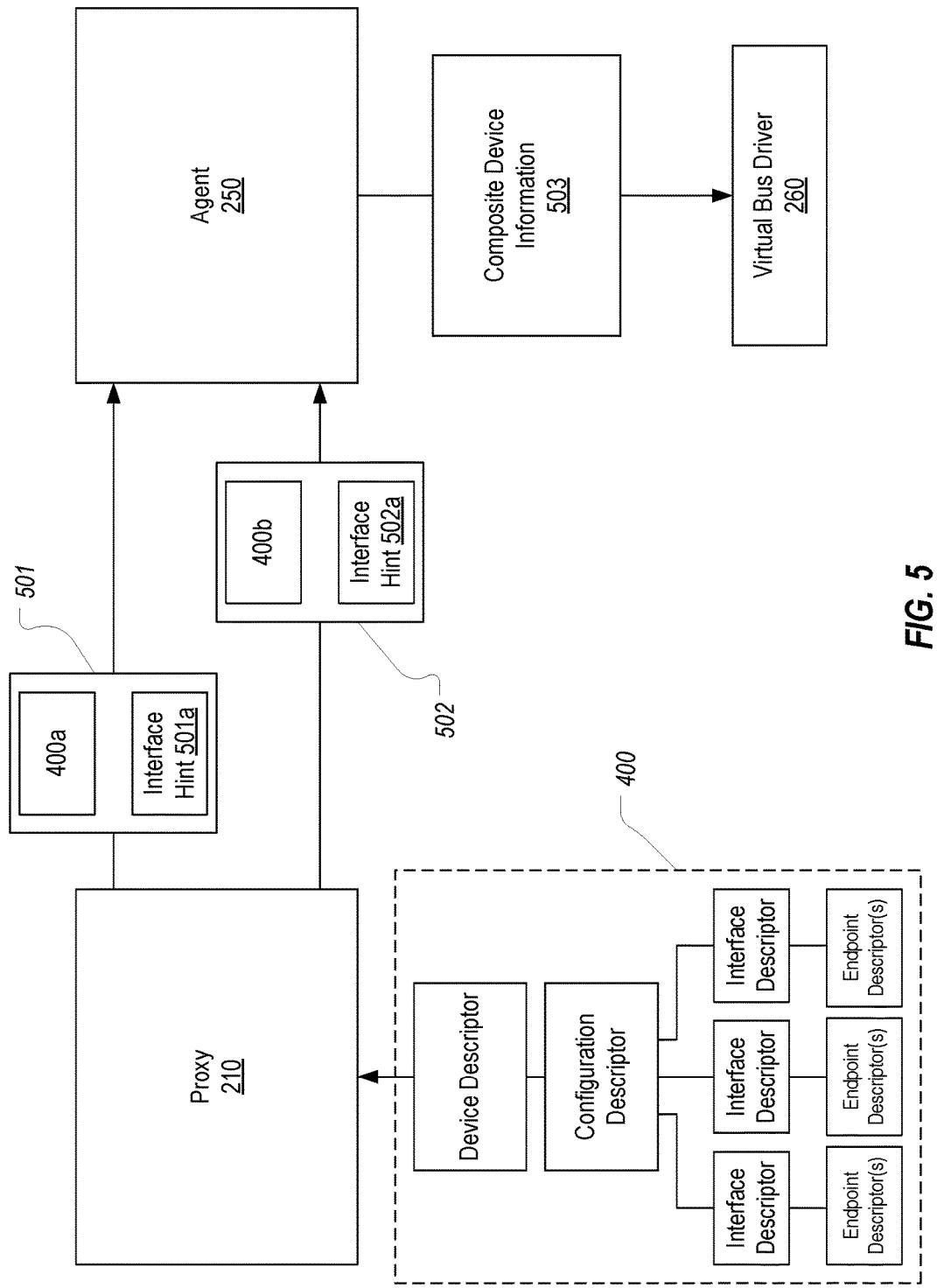
FIG. 5 illustrates how a client-side proxy can include an interface hint in each of a plurality of device arrival notifications pertaining to redirected interfaces of a composite device to allow the server-side agent to generate composite device information from the notifications.

FIG. 5 generally illustrates how proxy 210 and agent 250 can interact to enable the redirected interfaces to be recombined into a composite device at the server. Similar to FIG. 4, FIG. 5 depicts proxy 210 receiving device information 400 pertaining to composite device 440. Because proxy 210 is configured to redirect the webcam and HID interfaces, proxy 210 can generate a device arrival notification 501 pertaining to webcam interface 440a and a device arrival notification 502 pertaining to HID interface 440b. As described in the Background, proxy 210 can be configured to include subsets 400a, 400b in device arrival notifications 501, 502 respectively such that each interface is redirected as if it were a simple USB device.

However, in accordance with embodiments of the present invention, proxy 210 may also be configured to determine which interface number is assigned to each redirected interface within composite device 440 and include an interface hint 501a, 502a identifying this interface number in device arrival notifications 501, 502 respectively. For example, proxy 210 can determine that webcam interface 440a is interface 00 within composite device 440 and can therefore identify interface 00 within interface hint 501a. Similarly, proxy 210 can determine that HID interface 440b is interface 01 within composite device 440 and can therefore identify interface 01 within interface hint 502a.

Additionally, agent 250 can be configured to monitor for device arrival notifications that include interface hints. If agent 250 receives multiple related device arrival notifications that include interface hints, agent 250 can then recombine the corresponding information subsets to create appropriate device information for a composite device. For example, upon receiving device arrival notifications 501 and 502, agent 250 could determine that both notifications are related (e.g., by determining that both subsets 400a and 400b include the same device descriptor information) and that these notifications include interface hints 501a, 502a respectively. In response, agent 250 could create composite device information 503 which defines webcam interface 440a and HID interface 440b as interfaces of a composite device. In other words, agent 250 can recombine information from multiple device arrival notifications into a single composite device structure so that the redirected interfaces will not be treated as individual simple devices on server 104.

Figure 6A:
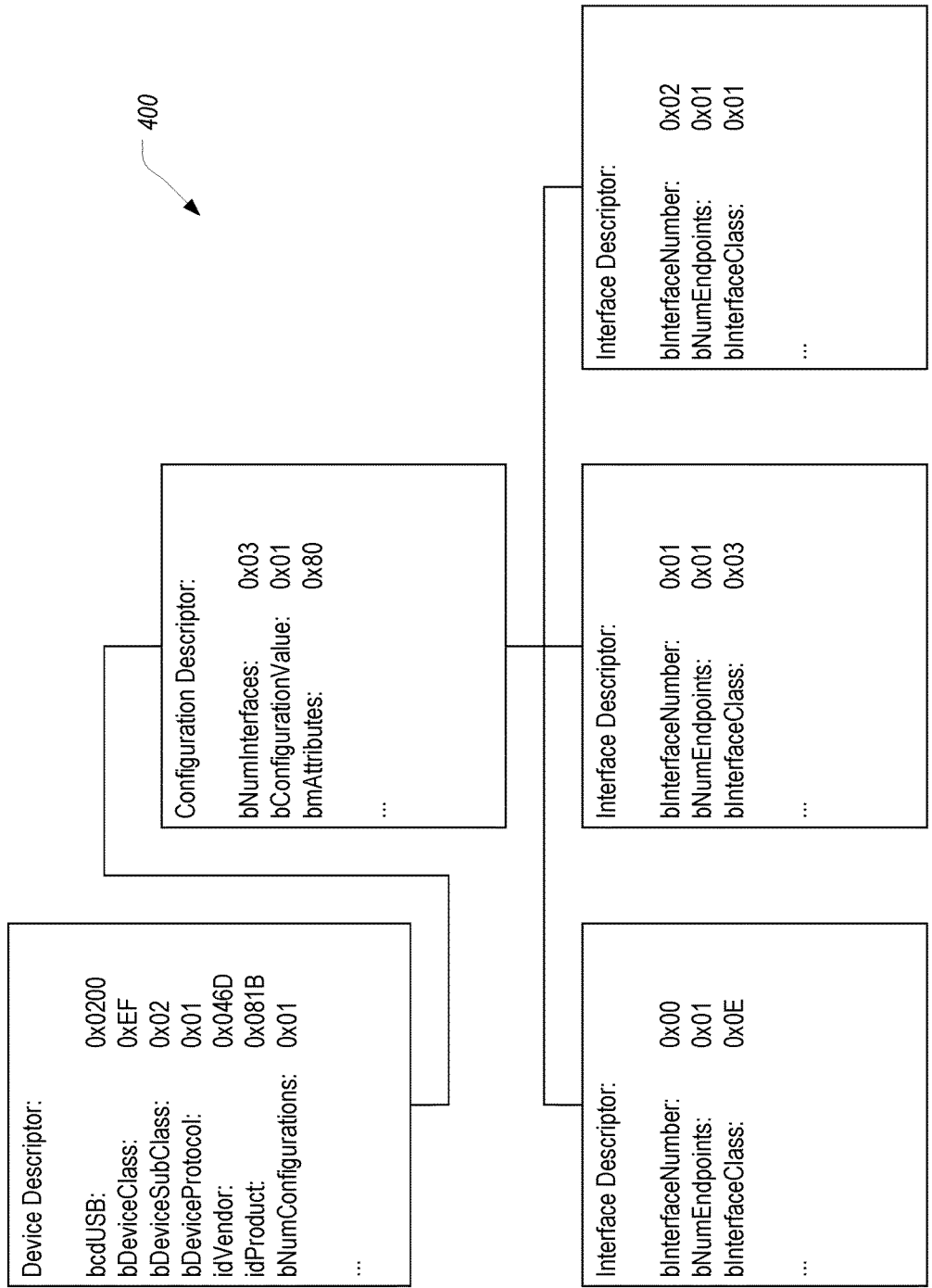
FIGS. 6A-6C provide a specific example of how the present invention can be implemented when the webcam and HID interfaces of a Logitech C310 HD webcam are redirected.
Figure 6B:
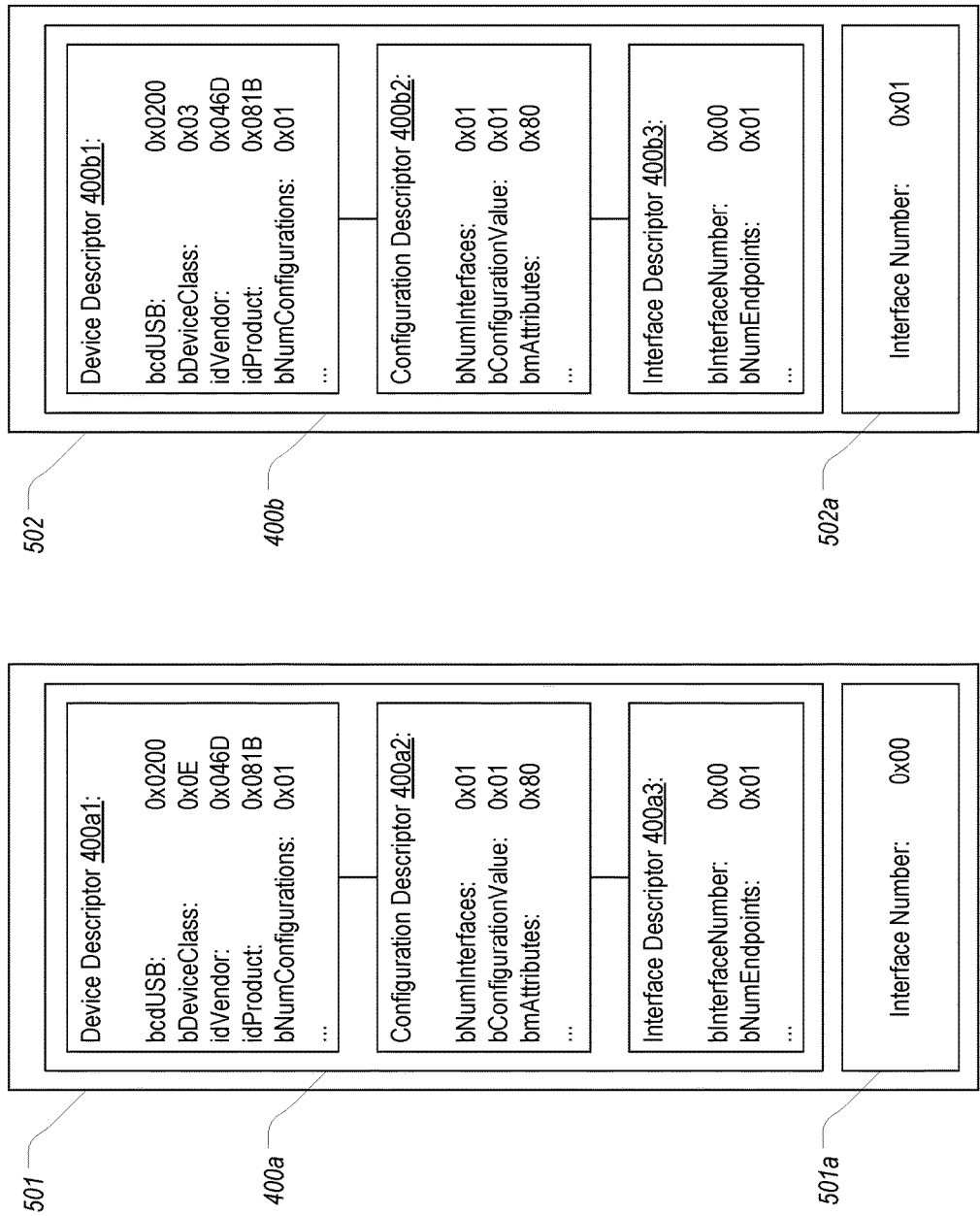
Figure 6C:
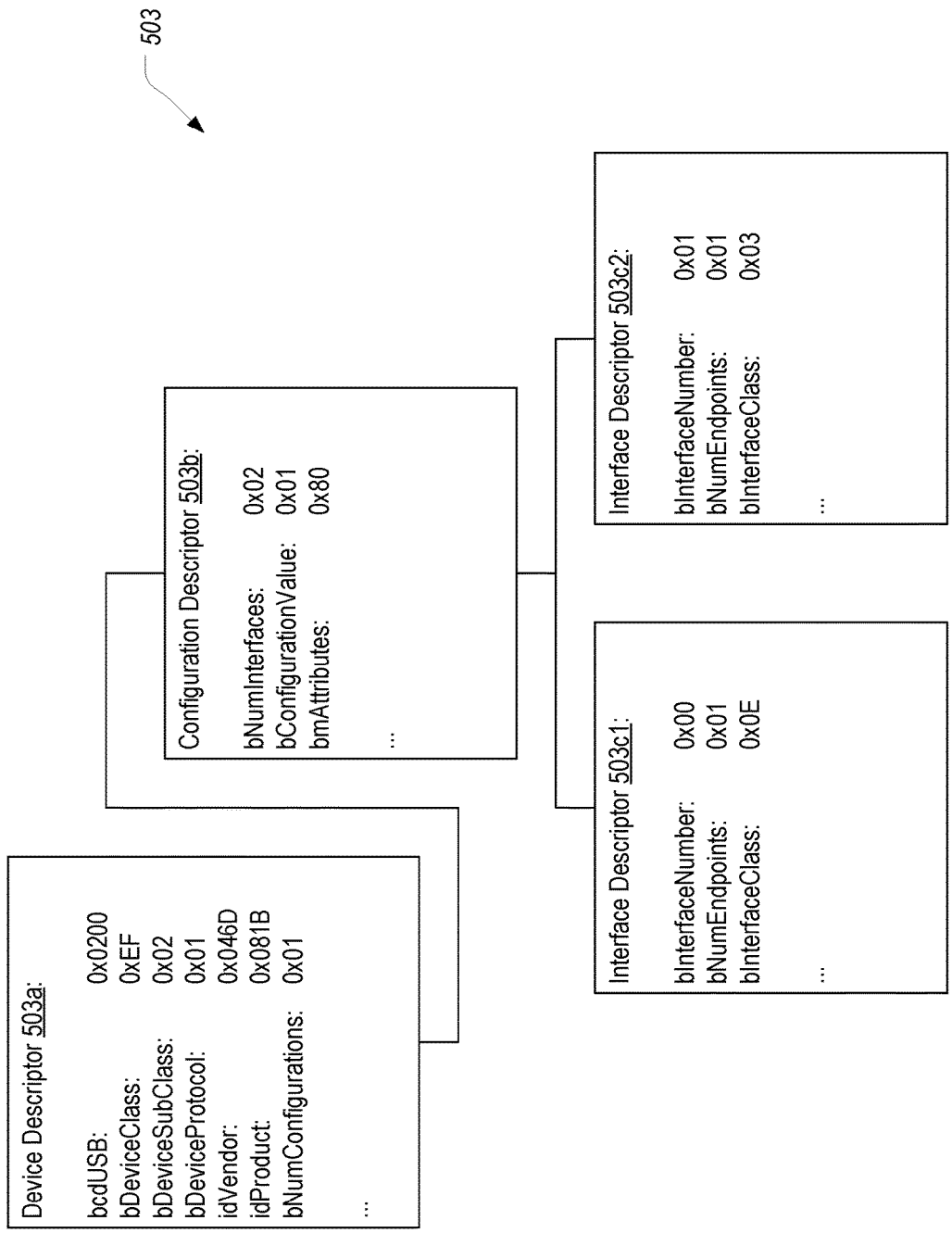

FIGS. 6A-6C provide a more detailed example of how proxy 210 and agent 250 may perform this functionality. FIG. 6A depicts an example of device information 400 that proxy 210 may receive when composite device 440 is connected to client terminal 102. Device information 400 as shown in FIG. 6A represents a portion of the information that may be received by proxy 210 as indicated by the ellipses in each data structure. Also, in this example, the endpoint descriptor structures will not be depicted for ease of illustration.

As shown, device information 400 can include a device descriptor having a number of fields. The device descriptor includes a bDeviceClass field having a value of 0xEF, a bDeviceSubClass field having a value of 0x02, and a bDeviceProtocol field having a value of 0x01 which indicate that the device descriptor pertains to a composite device. The device descriptor also includes an idVendor field set to 0x046D and an idProduct field set to 0x081B which are the values assigned to the Logitech C310 HD webcam composite device. The bcdUSB field simply indicates that the device complies with the USB 2.0 specification. The bNumConfigurations field, which defines the number of configurations for the device, is assumed to be set to one in order to simplify this example.

Device information 400 also includes a configuration descriptor. Most notably, the configuration descriptor includes a bNumInterfaces field that is set to 0x03 to indicate that there are three interfaces within this configuration—webcam interface 440a, HID interface 440b, and microphone interface 440c. The bConfigurationValue field simply defines the value (0x01) that can be used to select this configuration, while the bmAttributes field is set to 0x80 indicating that the device is bus powered.

Device information 400 further includes an interface descriptor for each of webcam interface 440a, HID interface 440b, and microphone interface 440c. Each of these interface descriptors includes a bInterfaceNumber field, a bNumEndpoints field, and a bInterfaceClass field. The value of the bInterfaceNumber field indicates the interface number of the interface within this configuration. In this case, webcam interface 440a is interface 00, HID interface 440b is interface 01, and microphone interface 440c is interface 02. The bInterfaceClass field defines what class of device the interface is. The value of 0x0E indicates that the interface is a video device, the value of 0x03 indicates that the interface is an HID device, and the value of 0x01 indicates that the interface is an audio device. The value of the bNumEndPoints field defines the number of endpoints for the interface which in this example will be assumed to be one for each interface. As noted above, the endpoint descriptor structures are not depicted for simplicity.

As described in the Background, proxy 210 can employ device information 400 to determine which interfaces of composite device 440 should be redirected. More specifically, proxy 210 can employ the values assigned to the bInterfaceClass fields (and possibly to bInterfaceSubClass and bInterfaceProtocol fields if defined) to determine whether the interface should be redirected. It is again noted that it will be assumed that proxy 210 is configured to redirect video and HID interfaces by treating each interface like a simple device. FIG. 6B illustrates how this can be done.

FIG. 6B provides examples of device arrival notifications 501 and 502 that proxy 210 can send to agent 250 after determining that webcam interface 440a and HID interface 440b should be redirected. Device arrival notification 501 includes subset 400a which is structured to represent webcam interface 440a as a simple device. In particular, subset 400a includes a device descriptor 400a1 having a bDeviceClass field with a value of 0x0E—the class code for video devices. As also shown in FIG. 6B, device arrival notification 502 includes subset 400b which is structured to represent HID interface 440b as a simple device. In particular, subset 400b includes a device descriptor 400b1 having a bDeviceClass field with a value of 0x03—the class code for HID devices.

In both subsets 400a and 400b, the other depicted fields of the device descriptor remain the same as in FIG. 6A. Therefore, device descriptor 400a1 in subset 400a identifies a simple video device while device descriptor 400b1 in subset 400b identifies a simple HID device. The configuration descriptor 400a2, 400b2 and interface descriptor 400a3, 400b3 in each subset have also been modified to appropriately represent the interfaces as simple devices. As shown, the bNumInterfaces field of configuration descriptors 400a2 and 400b2 has been set to 0x01 indicating that a single interface exists for the configuration. Similarly, the bInterfaceNumber field of interface descriptors 400a3 and 400b3 is set to 0x00 indicating that each interface descriptor represents the first (and only) interface for the configuration.

In accordance with embodiments of the present invention, device arrival notifications 501 and 502 can also include interface hints 501*a* and 502*a* respectively. Proxy 210 can employ interface hints 501*a* and 502*a* to inform agent 250 that, although device arrival notifications 501 and 502 include device information defining a simple device, the device information in each notification actually pertains to an interface of a composite device. As shown, proxy 210 can define interface hint 501*a* so that it identifies that subset 400*a* pertains to an interface of a composite device having an interface number of 00. Similarly, proxy 210 can define interface hint 502*a* so that it identifies that subset 400*b* pertains to an interface of a composite device having an interface number of 01. Based on the presence of interface hints 501*a* and 502*a* within device arrival notifications 501 and 502 (and based on the fact that the notifications both have the same values for the idVendor and idProduct fields), agent 250 can determine that subsets 400*a* and 400*b* should be combined to define a composite device.

FIG. 6C illustrates how agent 250 can combine subsets 400*a* and 400*b* to create composite device information 503. As shown, agent 250 can create a device descriptor 503*a* that includes the fields and corresponding values that are shared in common between subsets 400*a* and 400*b* (e.g., the idVendor and idProduct fields). Additionally, agent 250 can assign appropriate values to the bDeviceClass, bDeviceSubClass, and bDeviceProtocol fields. In this example, it will be assumed that these fields should appropriately be assigned values of 0xEF, 0x02, and 0x01 respectively. However, this need not necessarily be the case. For example, other values could be assigned which would define the device as a composite device (e.g., a value of 0x00 for the bDeviceClass field). In some embodiments, the particular values assigned to these fields could be based on the particular types of interfaces that are being combined into composite device information 503.

Agent 250 can also create configuration descriptor 503*b* with appropriate values to represent a composite device. As shown in FIG. 6B, configuration descriptor 503*b* includes a bNumInterfaces field which defines the number of interfaces that the composite device represented by composite device information 503 includes. The value assigned to the bNumInterfaces field can be based on the number of device arrival notifications that include an interface hint that agent 250 receives. Accordingly, in this example, the bNumInterfaces field is assigned a value of 0x02 to define that the composite device includes two interfaces (webcam interface 440*a* and HID interface 440*b*).

Agent 250 can also create an interface descriptor 503*c*1, 503*c*2 for each interface. Each interface descriptor 503*c*1, 503*c*2 can include a bInterfaceNumber field having a value that is based on the value specified in the corresponding interface hint. Each interface descriptor 503*c*1, 503*c*2 can also include a bInterfaceClass field (and possibly a bInterfaceSubClass and/or a bInterfaceProtocol field) having a value that is based on the value assigned to the bDeviceClass field of the corresponding device descriptor. Accordingly, in this example, the bInterfaceNumber and bInterfaceClass fields in interface descriptor 503*c*1 are assigned values based on the values specified in interface hint 501*a* (0x00) and the bDeviceClass field of device descriptor 400*a*1 (0x0E) respectively. Similarly, the bInterfaceNumber and bInterfaceClass fields in interface descriptor 503*c*2 are assigned values based on the values specified in interface hint 502*a* (0x01) and the bDeviceClass field of device descriptor 400*b*1 (0x03) respectively.

Once agent 250 has created composite device information 503, it can pass composite device information 503 onto virtual bus driver 260 to initiate the plug-and-play process on server 104. Operating system 170 will employ composite device information 503 to create the hardware identifiers that will be used to load the appropriate drivers. Because of the structure of composite device information 503, operating system 170 will generate hardware identifiers of Vid_046D&Pid_081B&MI_00 and Vid_046D&Pid_081B&MI_01 for webcam interface 440*a* and HID interface 440*b* respectively (or equally for virtual webcam 490*a* and virtual HID 490*b* respectively). More specifically, because composite device information 503 is structured to define a composite device, operating system 170 will generate hardware identifiers that also include the interface suffix "MI_xx." With these hardware identifiers, the appropriate (e.g., the vendor-provided) driver(s) will be loaded to manage virtual webcam 490*a* and virtual HID 490*b*.

It is noted that, although composite device information 503 in this example includes interface descriptors with sequential interface numbers, this need not be the case. For example, if microphone interface 440*c* were redirected while HID interface were not, interface descriptor 503*c*2 would instead have a bInterfaceNumber field that is assigned a value of 0x02 to appropriately identify that microphone interface 440*c* is interface number 02 in the composite device. This will ensure that the hardware identifier generated for microphone interface 440*c* on server 104 would include the appropriate interface number suffix (i.e., MI_02 rather than MI_01).

Figure 7A:
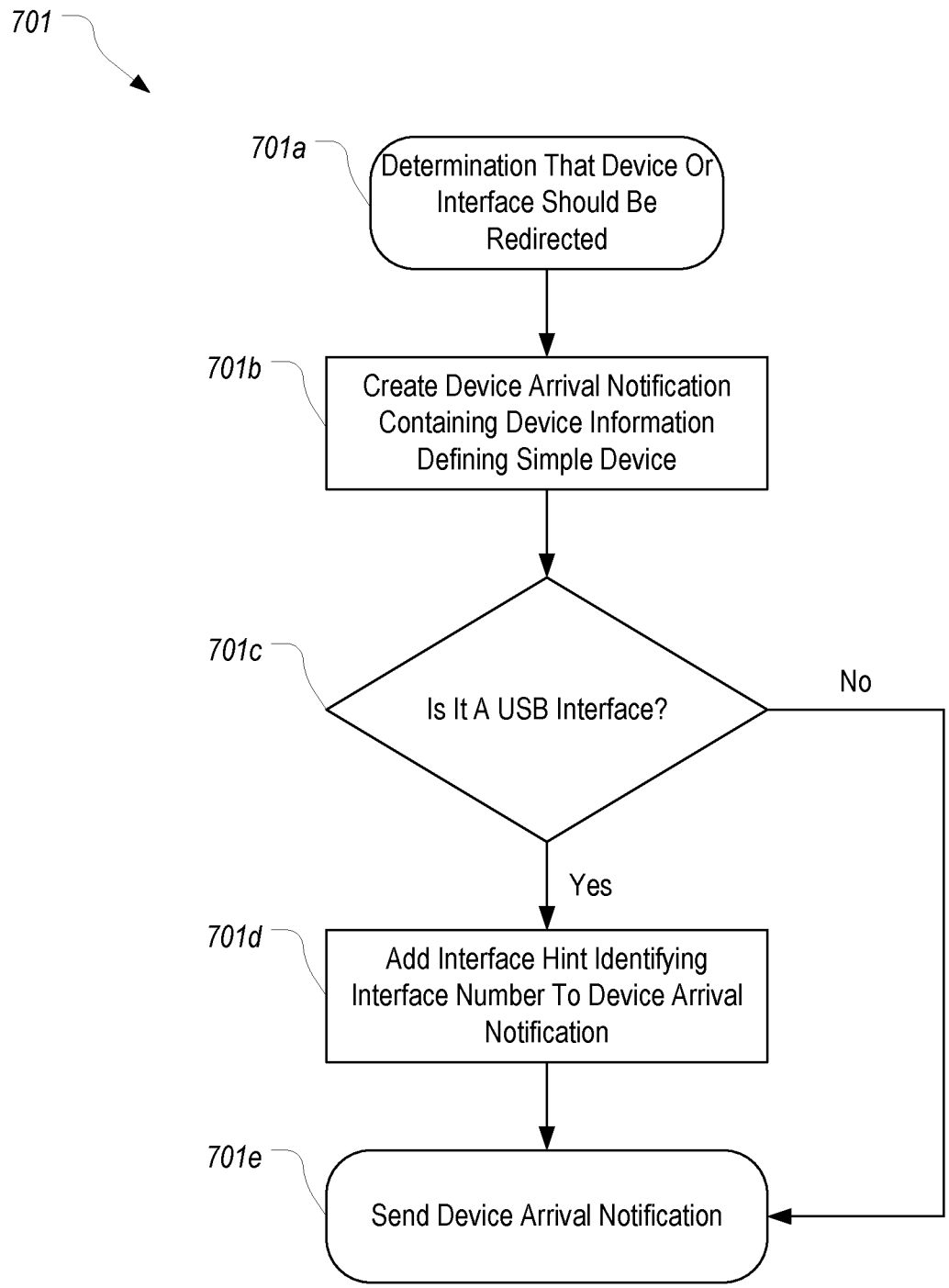
FIG. 7A illustrates a flowchart of the process that the client-side proxy can perform to add interface hints to device arrival notifications sent to the server-side agent.

FIG. 7A provides a flowchart representing a process 701 that proxy 210 can perform when it determines that a USB device or interface should be redirected. In an initial step 701*a*, proxy 210 determines that the device or interface should be redirected. In response, in step 701*b*, proxy 210 can prepare the appropriate device information for inclusion in a device arrival notification. If the device to be redirected is a simple device, proxy 210 may simply copy the device configuration into the device arrival notification. However, if an interface is to be redirected, proxy 210 may generate device information that represents the interface as a simple device in the manner described above.

Next, in step 701*c*, proxy 210 can determine whether the device arrival notification pertains to an interface of a composite device. If not, the device arrival notification can be directly sent in step 701*e*. However, if it is an interface, proxy 210 can add an interface hint identifying the interface number to the device arrival notification in step 701*d*, and then send the device arrival notification with the interface hint in step 701*e*.

Figure 7B:
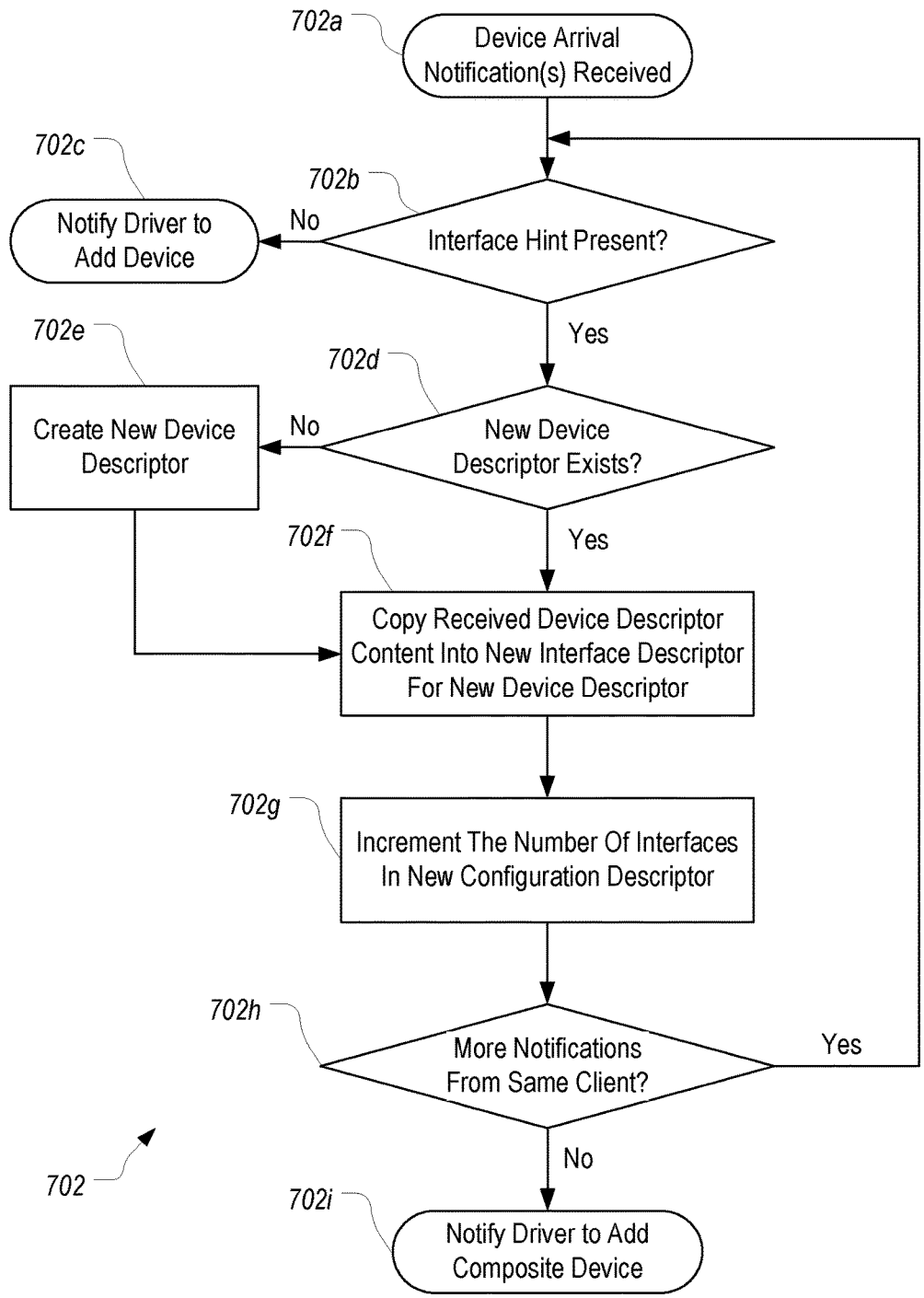
FIG. 7B illustrates a flowchart of the process that the server-side agent can perform to generate a new device descriptor representing a composite device when multiple interfaces are redirected as simple devices.

FIG. 7B provides a flowchart representing a process 702 that agent 250 can perform to process device arrival notifications. In initial step 702*a*, agent 250 receives one or more device arrival notifications from a proxy 210 executing on one or more client terminals 102. For each received notification, agent 250 determines if the notification includes an interface hint in step 702*b*. If not, the notification can be routed to virtual bus driver 260 in step 702*c* to allow the appropriate drivers to be loaded on server 104. In contrast, if the notification includes an interface hint, agent 250 can determine whether a new device descriptor already exists for this notification in step 702*d*. For example, agent 250 can determine whether it created a new device descriptor in response to receiving, from the same client terminal, a notification with the same product and vendor IDs and with an interface hint.

If a new device descriptor does not already exist (i.e., if this is the first notification pertaining to the redirected interfaces that has been processed), agent 250 can create a new device descriptor to represent the composite device in step 702*e*. Whether the new device descriptor is created or already exists, in step 702*f*, agent 250 can copy content from the device descriptor in the notification to a new interface descriptor pertaining to the new device descriptor. For example, agent 250 can copy a class code assigned to the bDeviceClass field in the notification's device descriptor into a bInterfaceClass field in the new interface descriptor.

Then, in step 702*g*, agent 250 can increment the number of interfaces defined in a new configuration descriptor pertaining to the new device descriptor. For example, agent 250 can increment the value assigned to the bNumInterfaces field in the new configuration descriptor. In step 702*h*, agent 250 can determine whether there are unprocessed device arrival notifications from the same client. If so, agent 250 can repeat the process to add any additional interfaces to the new device descriptor. If not, in step 702*i*, agent 250 can route the new device descriptor (including the accompanying configuration descriptor(s), interface descriptors, and endpoint descriptors) to virtual bus driver 260.

Figure 8:
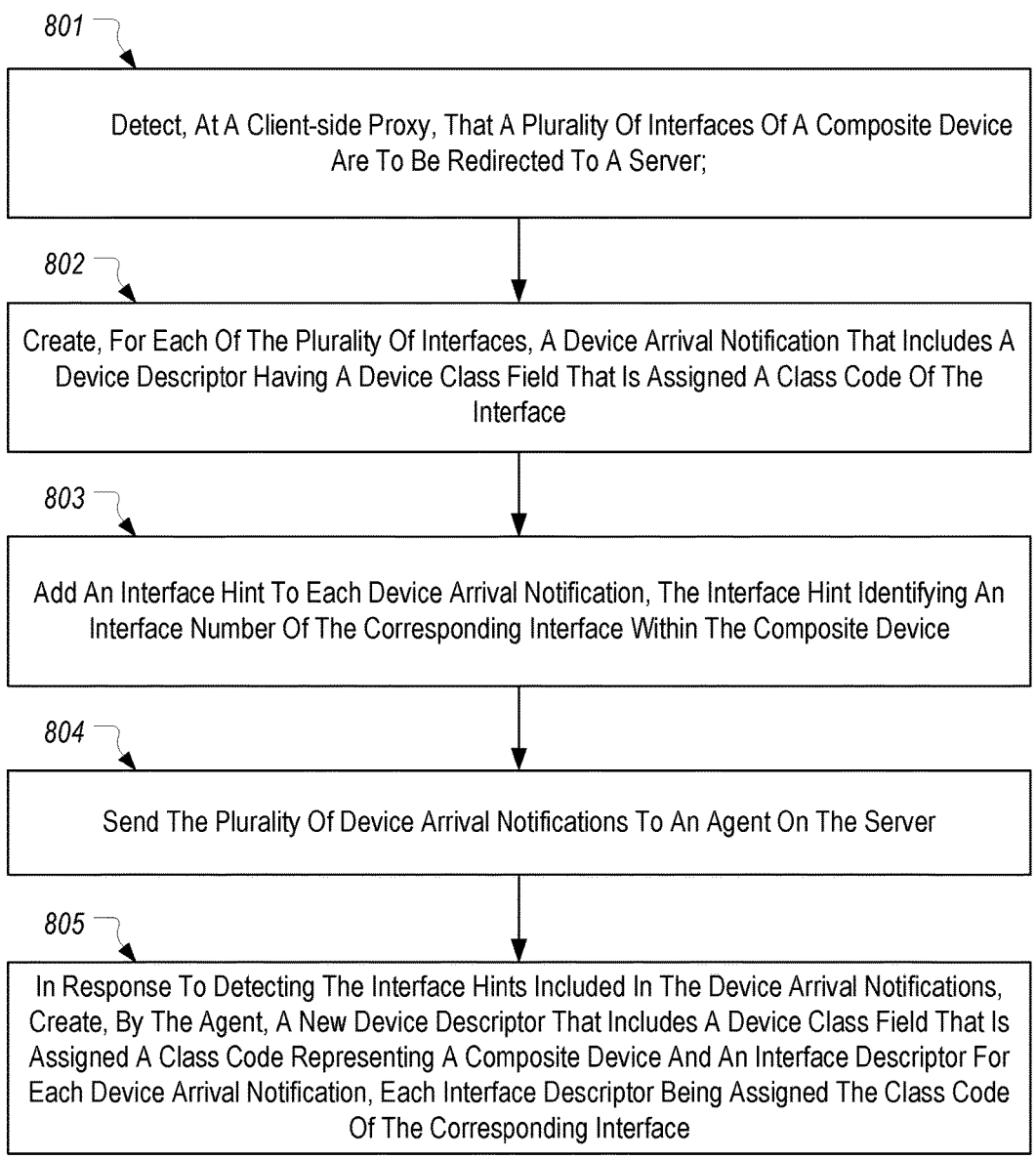
FIG. 8 illustrates a flowchart of an example method for combining multiple redirected USB interfaces into a single composite device.

FIG. 8 illustrates a flowchart of an example method 800 a method for combining multiple redirected USB interfaces into a single composite device. As an example, method 800 can be performed by proxy 210 and agent 250.

Method 800 includes an act 801 of detecting, at a client-side proxy, that a plurality of interfaces of a composite device are to be redirected to a server. For example, proxy 210 can determine that webcam interface 440*a* and HID interface 440*b* of composite device 440 are to be redirected.

Method 800 includes an act 802 of creating, for each of the plurality of interfaces, a device arrival notification that includes a device descriptor having a device class field that is assigned a class code of the interface. For example, proxy 210 can create device arrival notifications 501 and 502 containing subsets 400*a* and 400*b* respectively.

Method 800 includes an act 803 of adding an interface hint to each device arrival notification, the interface hint identifying an interface number of the corresponding interface within the composite device. For example, proxy 210 can include interface hints 501*a* and 502*a* in device arrival notifications 501 and 502 respectively.

Method 800 includes an act 804 of sending the plurality of device arrival notifications to an agent on the server. For example, proxy 210 can send device arrival notifications 501 and 502 to agent 250.

Method 800 includes an act 805 of, in response to detecting the interface hints included in the device arrival notifications, creating, by the agent, a new device descriptor that includes a device class field that is assigned a class code representing a composite device and an interface descriptor for each device arrival notification, each interface descriptor being assigned the class code of the corresponding interface. For example, upon receiving device arrival notifications 501 and 502, agent 250 can create composite device information 503 which includes device descriptor 503*a* and interface descriptors 503*c*1 and 503*c*2.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for combining multiple redirected USB interfaces into a single composite device, the method comprising:
   detecting, at a client-side proxy, that a plurality of interfaces of a composite device are to be redirected to a server;
   creating, by the client-side proxy and for each of the plurality of interfaces, a device arrival notification that includes device information pertaining to the interface such that a separate device arrival notification is created for each of the plurality of interfaces of the composite device that are to be redirected to the server;
   adding, by the client-side proxy, an interface hint to each device arrival notification, the interface hint identifying an interface number of the corresponding interface within the composite device;

sending, by the client-side proxy, the plurality of device arrival notifications to an agent on the server;
receiving, by the agent on the server, the plurality of device arrival notifications;
detecting, by the agent and for each device arrival notification, the presence of the interface hint in the device arrival notification;
generating, by the agent, composite device information by combining the device information from each of the device arrival notifications such that the composite device information defines each of the plurality of interfaces as interfaces of a composite device on the server; and
causing, by the agent, the composite device information to be reported to an operating system on the server to thereby cause the composite device having the plurality of interfaces to be enumerated on the server.

2. The method of claim 1, wherein the plurality of interfaces of the composite device are less than all the interfaces of the composite device such that at least one interface of the composite device is not redirected.

3. The method of claim 1, wherein the device information pertaining to the interface that is included in each device arrival notification comprises a device descriptor that includes a device class field that is assigned a class code of the interface.

4. The method of claim 3, wherein generating composite device information comprises generating a new device descriptor that includes a device class field that is assigned a class code representing a composite device.

5. The method of claim 4, wherein generating composite device information comprises, for each device arrival notification:
generating a new interface descriptor pertaining to the new device descriptor;
extracting the class code of the interface from the device descriptor included in the device arrival notification; and
assigning the class code of the interface to an interface class field defined in the new interface descriptor.

6. The method of claim 5, wherein generating composite device information comprises:
generating a new configuration descriptor that includes a number of interfaces field; and
setting the value of the number of interfaces field based on the number of device arrival notifications.

7. The method of claim 1, further comprising:
detecting, at the client-side proxy, that a device is to be redirected;
creating an additional device arrival notification that includes device information pertaining to the device; and
sending the additional device arrival notification without adding an interface hint to the additional device arrival notification.

8. The method of claim 1, further comprising:
receiving an additional device arrival notification;
detecting that the additional device arrival notification does not include an interface hint; and
routing the additional device arrival notification to a virtual bus driver on the server.

9. A method for combining multiple redirected USB interfaces into a single composite device, the method comprising:
receiving, by an agent on a server, a plurality of device arrival notifications, each device arrival notification including device information pertaining to a redirected interface of a composite device;
detecting, by the agent and for each device arrival notification, the presence of an interface hint in the device arrival notification;
generating, by the agent, composite device information by combing the device information from each of the device arrival notifications such that the composite device information defines each of the interfaces as interfaces of a composite device on the server; and
causing, by the agent, the composite device information to be reported to an operating system on the server to thereby cause the composite device having the plurality of interfaces to be enumerated on the server.

10. The method of claim 9, wherein the device information pertaining to a redirected interface of a composite device represents the redirected interface as a simple device.

11. The method of claim 9, wherein the interface hint in each device arrival notification defines an interface number assigned to the corresponding interface.

12. The method of claim 9, wherein the device information pertaining to a redirected interface of a composite device comprises a device descriptor that includes a device class field that is assigned a class code of the interface.

13. The method of claim 12, wherein generating composite device information that includes the device information from each of the device arrival notifications comprises:
generating a new device descriptor that includes a device class field that is assigned a class code representing a composite device.

14. The method of claim 13, wherein generating composite device information that includes the device information from each of the device arrival notifications further comprises:
for each device arrival notification, generating a new interface descriptor that includes an interface class field, and assigning the class code of the corresponding interface to the interface class field.

15. The method of claim 14, wherein generating composite device information that includes the device information from each of the device arrival notifications further comprises:
generating a new configuration descriptor that includes a number of interfaces field; and
setting the value of the number of interfaces field based on the number of device arrival notifications.

16. The method of claim 9, further comprising:
receiving an additional device arrival notification that includes device information;
detecting that the additional device arrival notification does not include an interface hint; and
routing the device information from the additional device arrival notification to a virtual bus driver.

17. The method of claim 9, wherein causing the composite device information to be reported to the operating system comprises routing the composite device information to a virtual bus driver.

18. One or more computer storage media storing computer executable instructions which when executed in a computing system implement a method for combining multiple redirected USB interfaces into a single composite device, the method comprising:
detecting, at a client-side proxy, that a plurality of interfaces of a composite device are to be redirected to a server;
creating, by the client-side proxy and for each of the plurality of interfaces, a device arrival notification that includes a device descriptor having a device class field that is assigned a class code of the interface such that a separate device arrival notification is created for each of the plurality of interfaces of the composite device that are to be redirected to the server;

adding, by the client-side proxy, an interface hint to each device arrival notification, the interface hint identifying an interface number of the corresponding interface within the composite device;

sending, by the client-side proxy, the plurality of device arrival notifications to an agent on the server;

in response to detecting the interface hints included in the device arrival notifications, creating, by the agent, a new device descriptor that includes a device class field that is assigned a class code representing a composite device and an interface descriptor for each device arrival notification, each interface descriptor being assigned the class code of the corresponding interface; and causing, by the agent, the new device descriptor to be reported to an operating system on the server to thereby cause the composite device having the plurality of interfaces to be enumerated on the server.

19. The computer storage media of claim 18, wherein the method further comprises:

creating, by the agent, a new configuration descriptor that includes a number of interfaces field that is assigned a value based on the number of device arrival notifications.

\* \* \* \* \*